United States Patent Office 3,368,160
Patented Feb. 6, 1968

3,368,160
ATOMIC FREQUENCY STANDARD EMPLOYING TANDEM SECOND HARMONIC AND FUNDAMENTAL PHASE SENSITIVE DETECTION FOR FREQUENCY LOCK
Alan L. Helgesson, Los Altos Hills, Calif., assignor to Varian Associates, Palo Alto, Calif., a corporation of California
Filed Dec. 9, 1966, Ser. No. 600,502
9 Claims. (Cl. 331—3)

ABSTRACT OF THE DISCLOSURE

The present invention relates in general to atomic frequency standards or clocks and, more particularly, to an improved frequency lock feedback control network for such standards which employs two stage phase sensitive detection and simple resistance-capacitance filters, whereby the frequency control loop is rendered insensitive to frequency shifts in the control loop and whereby relatively heavy and bulky tuned filters are eliminated. Such improved atomic frequency standards are especially useful for, but not limited in use to, providing synchronized time standards for a worldwide manned space control and tracking network.

---

Figure 1:
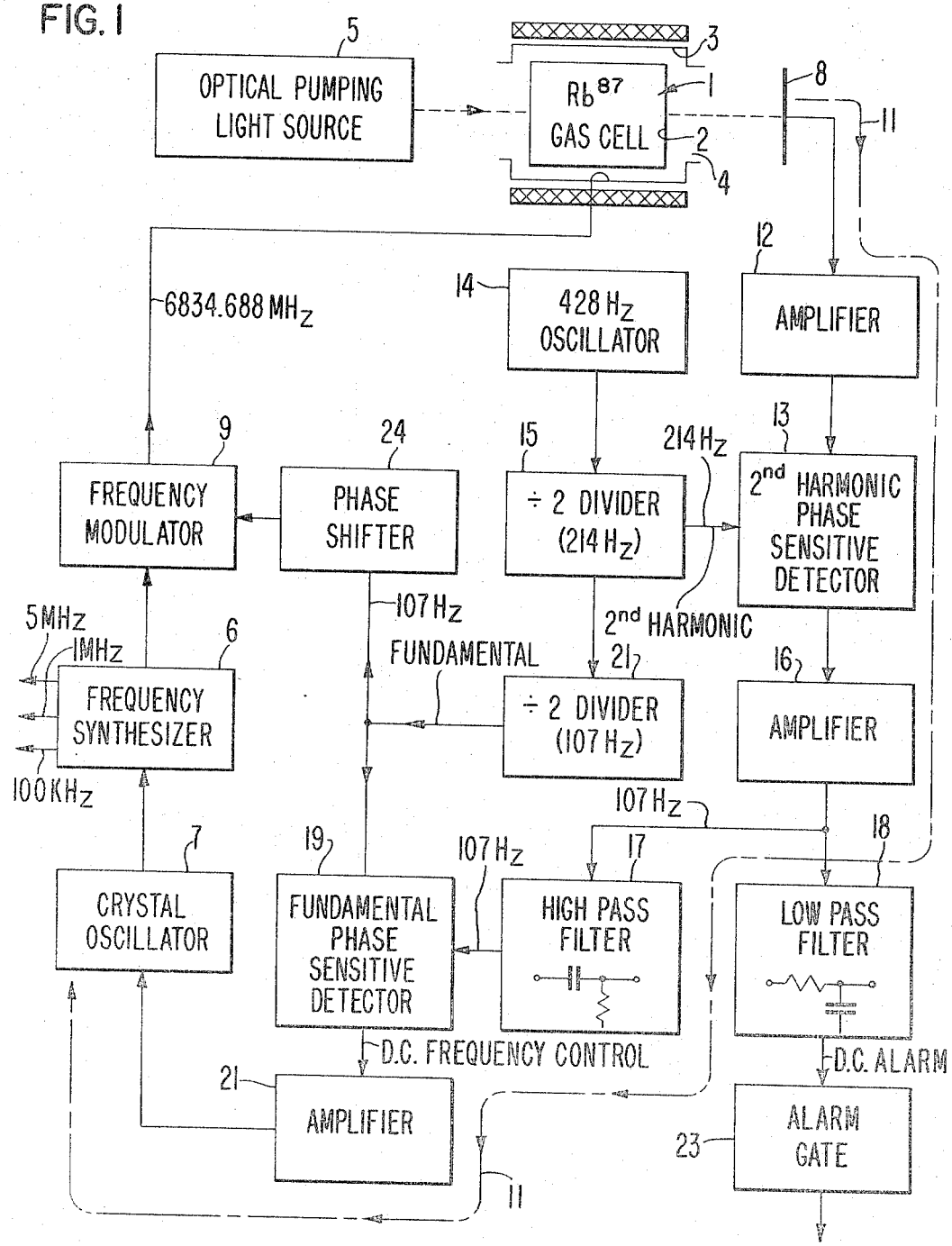

The invention described herein was made in the performance of work under a NASA contract and is subject to the provisions of section 305 of the National Aeronautics and Space Act of 1958, Public Law 85–568 (72 Stat. 435; 42 U.S.C. 2457).

Heretofore, atomic resonant frequency standards have employed a feedback control circuit for locking the output of the standard to an atomatic resonance line of the frequency standard. Such a system is described in U.S. patent application 528,649 filed Feb. 18, 1966, and assigned to the same assignee as that of the present invention.

In these prior systems, the R.F. field which is applied to the atomic resonant bodies to excite resonance thereof is frequency modulated at a low frequency as of 100 Hz. about its center frequency. If the center frequency of the applied R.F. field is at the atomic resonance frequency, then the detected resonance signal will be modulated at twice the modulation frequency and the detected output signal will contain no signal at the modulation frequency. In other words, there will be a strong second harmonic component of the modulation frequency and no fundamental component. On the other hand, if the center frequency of the resonance exciting R.F. field is slightly off resonance, then the second harmonic component will decrease in amplitude and there will be a fundamental component at the modulation frequency. The second harmonic component is amplified, filtered out and used as an alarm signal. The resonance signal is then further filtered by tuned filter means to pass only the fundamental component to a phase sensitive detector. The D.C. output of the fundamental phase sensitive detector is used to lock the frequency of the applied radio frequency field to the center of the atomic resonance line. The second harmonic component serves as an alarm signal indicating frequency lock has been lost. The alarm is tripped when the amplitude of the second harmonic content falls below a certain predetermined threshold amplitude. The fundamental component is used for frequency lock and is not a suitable alarm signal since it has zero amplitude for a lock condition and also for a condition wherein the frequency of the R.F. resonance exciting field is substantially off the atomic resonance line.

The problem with this prior art system is that the tuned filter networks used for separating the fundamental component from the second harmonic component have been relatively heavy and bulky. In addition, these tuned circuits have been relatively sensitive to temperature such that their tuned frequency varied with temperature, thus, introducing errors in the control loop.

In the present invention, the tuned filter circuits have been eliminated by employing two series stages of phase sensitive detection of the detected resonance signal. The first stage of phase sensitive detection operates upon the detected atomic resonance signal and detects for the second harmonic content. The output of the first stage includes a D.C. second harmonic output with the fundamental component superimposed thereon. A simple RC low pass filter separates the D.C. second harmonic output for the alarm circuit. A simple RC high pass filter separates the fundamental component which is fed to a second stage of phase sensitive detection to produce a D.C. fundamental output signal for locking the center frequency of the applied R.F. resonance exciting field to the atomic resonance line. As a result, the troublesome tuned filters have been eliminated, thereby reducing the size and weight of the control circuitry to about one third that of the prior art and making the control much less sensitive to temperature variation.

In a preferred embodiment of the present invention, the phase sensitive detectors are transistorized synchronous switches which are switched by fundamental and second harmonic square wave signals derived from a common signal generator.

The principal object of the present invention is the provision of an improved atomic frequency standard.

One feature of the present invention is the provision of a frequency control feedback circuit employing two series stages of phase sensitive detection of the modulated resonance output signal, the first stage of phase sensitive detection detecting for the second harmonic content and the second stage detecting for the fundamental harmonic content, whereby tuned filter circuits may be eliminated for separation of these components.

Another feature of the present invention is the same as the preceding feature wherein the reference fundamental and second harmonic components for the phase sensitive detecting stages are derived from a common signal generator, whereby a phase coherent control system is obtained.

Another feature of the present invention is the same as any one or more of the preceding features wherein the reference signals for the phase sensitive detecting stages are symmetrical square waves, whereby the fundamental and second harmonic reference signals are generated in pure form without the fundamental reference signal containing even harmonic signals and vice versa.

Another feature of the present invention is the same as any one or more of the preceding features wherein the phase sensitive detectors are synchronous switching detectors, whereby the phase sensitive detector stages are simplified and rendered insensitive to temperature.

Another feature of the present invention is the same as any one or more of the preceding features including a phase shifter for shifting the phase of a square wave at the fundamental modulation frequency, such phase shifter including a square wave generator slaved to and operating at the fundamental frequency and means for triggering the square wave generator at controllable times to produce the phase shifted square wave.

Figure 2:
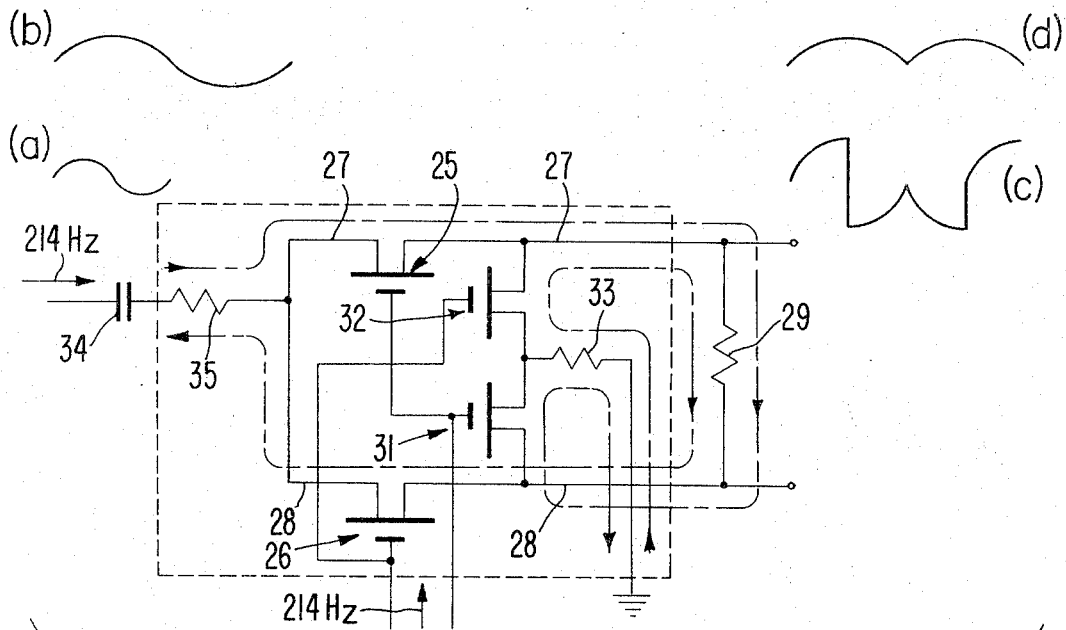
Figure 3:
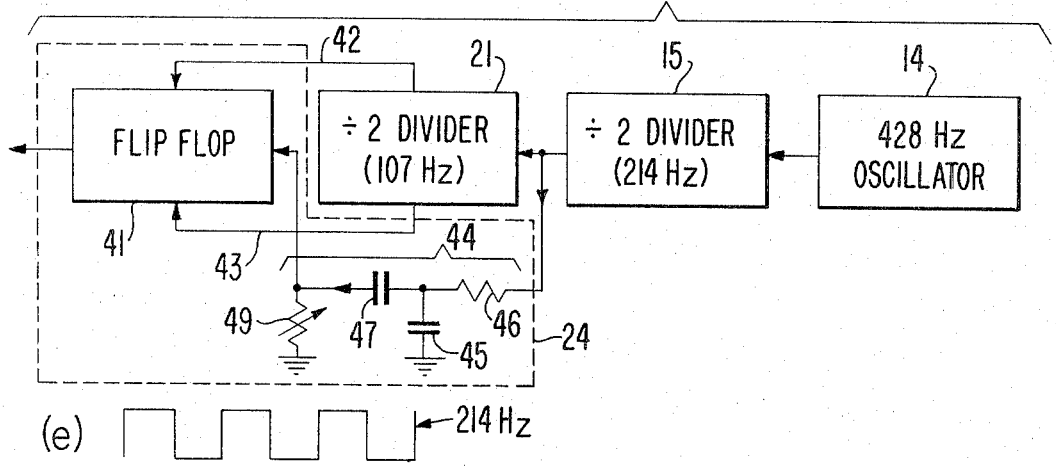

Other features and advantages of the present invention will become apparent upon a perusal of the following specification taken in connection with the accompanying drawings wherein:

FIG. 1 is a schematic block diagram of an atomic frequency standard employing features of the present invention, and FIG. 2 is a circuit diagram of the synchronous switching detector portions of the circuit of FIG. 1, and FIG. 3 is a schematic block diagram of a phase shifter for shifting the phase of a square wave.

Referring now to FIG. 1 there is shown an atomic frequency standard of the present invention. More particularly, a system of atomic resonators 1 such as, for example, rubidium 87 vapor is contained within an optically and radio frequency transparent gas cell 2. A radio frequency resonant cavity 3 surrounds the gas cell 2 and is apertured at its ends 4 for passage of optical pumping radiation therethrough. Optical pumping radiation is applied to the atomic resonators 1 from a source 5 for raising the system of resonators 1 to a non-equilibrium energy state.

Radio frequency field independent hyperfine resonant transitions are excited by a radio frequency field applied to the atomic resonators 1 via the cavity 3. The cavity 3 is excited with radio frequency energy at the transition frequency of 6834.688 mHz. as derived from a frequency synthesizer 6. The reference frequency input to the frequency synthesizer 6 is obtained from a crystal oscillator 7.

At resonance of the atomic resonators 1, the atomic resonators absorb a maximum amount of the optical pumping radiation. A photocell 8 is disposed to monitor the amount of optical pumping radiation passing through the gas cell 2 thereby monitoring or detecting resonance of the resonators 1. A frequency modulator 9 serves to modulate the frequency of the applied radio frequency field about the center frequency thereof at some convenient low frequency such as between 100 and 200 Hz., in this case 107 Hz.

The frequency modulation of the applied R.F. field modulates the absorption of the optical pumping radiation by the atomic resonators 1 and, thus, modulates the intensity of the detected atomic resonance signal picked up by the photocell 8. When the center frequency of the applied R.F. field is precisely at the atomic resonance frequency of the atomic resonators 1 the detected signal at photocell 8 will have an intense component at the second harmonic of the modulation frequency and a null amplitude component at the fundamental of the modulation frequency. Conversely, if the center frequency of the applied R.F. field is somewhat off resonance of the atomic resonators the second harmonic content of the detected resonance signal will have a decreased amplitude and the fundamental component content will have an increased amplitude.

The fundamental component of the detected resonance signal is employed in a feedback loop 11 for correcting the center frequency of the applied R.F. field, as derived from the frequency synthesizer 6 and crystal 7, to precisely the hyperfine resonant frequency of the atomic resonators 1.

The feedback loop 11 includes a pre-amplifier 12 which amplifies the output of the photocell 8 and feeds it to one input of a second harmonic phase sensitive detector 13. The reference second harmonic input for the phase sensitive detector 13 is obtained from a 428 Hz. relaxation oscillator 14 via a by-2-divider 15, such as, for example, a flip-flop circuit. The output of the second harmonic phase sensitive detector 13 contains a D.C. component with an amplitude proportional to the amplitude of the second harmonic content of the detected resonance signal. The output also contains a component at the fundamental modulation frequency. These components are amplified by amplifier 16 and separated by high and low pass filters 17 and 18, respectively.

High pass filter 17 is formed by a simple resistance and capacitance network and serves to pass the fundamental modulation component to one input of a second phase sensitive dector 19 wherein it is phase sensitive detected against a reference signal at the fundamental modulation frequency. The fundamental reference signal at 107 Hz. is derived from the second harmonic output of divider 15 at 214 Hz. via a second by-2-divider 21. The output of the fundamental phase sensitive detector 19 is a D.C. signal having an amplitude and phase proportional to the amplitude and phase of the fundamental modulation component in the detected resonance signal.

The fundamental D.C. signal, in the output of phase sensitive detector 19, is amplified by operational amplifier 22 and fed to the crystal oscillator 7 for tuning the crystal oscillator to a frequency which will bring the center frequency of the synthesized applied R.F. magnetic field at 6834.688 mHz. to precisely the center frequency of the atomic resonance line of the atomic resonators 1. The synthesizer 6 also provides synthesized output signals at more convenient frequencies such as 100 kHz., 1 mHz., and 5 mHz. These outputs are also corrected by the feedback loop 11 since they are derived in the synthesizer 6 from the control crystal oscillator 7.

The low pass filter 18, which is operable upon the amplified output of the first stage of phase sensitive detection (second harmonic phase sensitive detector 13), passes the detected second harmonic D.C. component to an alarm gate 23 wherein it serves to trip an alarm if its amplitude falls below a certain predetermined amount. The alarm serves as a signal indicating that frequency lock has been lost. An adjustable phase shifter 24 is provided for adjusting the phase of the frequency modulation applied to the resonance exciting R.F. field to obtain the correct phase relations between the reference modulation signals and the resonance modulation components around the feedback loop 11.

In a preferred embodiment of the present invention, as shown in FIG. 1, the fundamental and second harmonic reference signals are derived from a common source 14. In addition, it is desired that these reference signals be derived in pure form; i.e., pure odd harmonic content such that these reference signals do not contain second harmonic content. For example, the fundamental at 107 Hz. should contain no 214 Hz. or 428 Hz. components. Also the second harmonic at 214 Hz. should contain no 107 Hz or 428 Hz. components. Accordingly, in a preferred embodiment the by-2-dividers 15 and 21 are flip-flops generating symmetrical square wave outputs derived from the common source 14. Such square waves have only odd harmonic content without mixtures of even and odd harmonics.

It is also preferred that the phase sensitive detectors 13 and 19 be of the synchronous switching type as shown in FIG. 2. More specifically, two field effect transistors 25 and 26 are series connected in two parallel branches 27 and 28 which are connected to opposite ends of a load resistor 29, as of 150KΩ. The load resistor 29 serves as the input load of an operational amplifier, not shown. A second pair of field effect transistors 31 and 32 are connected in series across the parallel branches 27 and 28. The series connection of transistors 31 and 32 is center tapped to ground via resistor 33 as of 8KΩ. The input signal to be phase sensitive detected is coupled to the parallel branches 27 and 28 via coupling capacitor 34 and series resistor 35 as of 8KΩ. The reference square wave signal for the phase sensitive detector is coupled into the transistors 25, 26, 31, and 32 via leads 36 and 37.

On one half cycle of the reference input square wave, transistors 25 and 31 are rendered conductive and the other transistors 26 and 32 are rendered non-conductive. Accordingly, on the positive half cycle of the second harmonic input signal (see wave form (a)) at the frequency of the square wave reference signal, the positive current flows through branch 27, transistor 25, resistor 29 thence through branch 28 and transistor 31 and resistor 33 to ground. On the other half cycle of the input signal, the transistors are switched and the current reverses and flows from ground through resistor 33, transistor 32, branch 27, load resistor 29, thence through branch 28, transistor 26, resistor 35, and to the signal source, not shown.

Thus, the input signal, at the frequency of the square wave reference signal, is converted to a D.C. signal across load resistor 29.

In the case where the synchronous switching detector of FIG. 2 is employed for the first stage of phase sensitive detection, as detector 13 in the circuit of FIG. 1, the fundamental modulation component, as shown in wave form (b), is converted at the output to wave form (c). This wave form has no D.C. component and, thus, is easily separated from the D.C. second harmonic component.

Wave form (c) forms the input wave form for the second stage of phase sensitive detection in detector 19. The second synchronous switching detector 19 converts wave form (c) to wave form (d) in its output. Wave form (d) has a strong D.C. component which serves as the frequency control output of the second detector 19.

The advantage of the synchronous switching detectors 13 and 19 is that they require no inductive coupling transformers or tuned circuits and, thus, are not frequency sensitive devices. If the frequency of the oscillator 14 shifts due to temperature variations or the like, then the modulation and reference frequencies shift accordingly and the performance of the feedback control loop 11 is not adversely affected.

In a preferred embodiment of the present invention, the phase shifter 24 takes the form as depicted in FIG. 3. More particularly, a flip-flop 41 (square wave generator) is slaved to the second by-2-divider 21 via inputs 42 and 43 to produce a square wave output at the fundamental frequency of 107 Hz. However, the phase of the output of the flip-flop 41 is variable by means of a trigger and variable bias circuit 44.

The trigger circuit 44 is operable upon the 214 Hz. square wave output of the first by-2-divider 15, as shown by wave form (e), to produce a sawtooth wave form (f). The sawtooth wave form (f) is produced by integration of the square wave (e) by shunt capacitor 45 and series resistor 46. The sawtooth wave form (f) is coupled from the integrator via D.C. blocking capacitor 47 and superimposed upon a D.C. voltage level 48, see wave form (f), in the input circuit of the flip-flop 41. The D.C. voltage level 48 is adjustable by means of variable resistor 49. The D.C. voltage level 48 determines the point $t$ in time where the flip-flop 41 is triggered by the sawtooth voltage exceeding the threshold D.C. level 48.

The output of the flip-flop 41 is shown as wave form (h). As seen from wave forms (f) and (h) the output of the flip-flop 41 is phase shifted by $\phi$ compared to the phase of the 107 Hz. output of hte by-2-divider 21, as shown by wave form (g). The amount of phase shift $\phi$ is determined by the trigger time, $t$, which is dependent upon the time the sawtooth wave (f) crosses the D.C. bias threshold level 48. Thus, by varying the D.C. bias threshold level via variable resistor 49, the trigger time $t$ can be varied to vary the phase shift $\phi$.

The advantage of the phase shifter 24 of FIG. 3 over conventional phase shifters is that conventional phase shifters would require relatively heavy and bulky inductive networks to shift the phase of the square wave at 107 Hz. without introducing distortion thereof. Such distortion would introduce undesired second harmonic components into the applied modulation of the resonance conditions, Moreover, the relatively heavy and bulky inductors are replaced by relatively small and light weight RC networks and a flip-flop 41.

Although the atomic frequency standard of FIG. 1 has been described as a rubidium frequency standard, the improved frequency control feedback circuit of the present invention may be employed with atomic frequency standards in general. For example, it may be used to advantage with cesium and thallium beam frequency standards. Furthermore, other quantum resonant systems other than atoms may be used. For example, molecules and portions of atoms such as atomic nuclei may be used as the resonator system to which the output frequency of the standard is locked. Thus, "atomic resonator systems" as used herein is defined to include all such other quantum resonant systems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An atomic frequency standard including means forming a system of atomic resonators, means for applying a radio frequency field to the atomic resonators for exciting resonance thereof, means for detecting resonance of the atomic resonators, means for modulating the resonance conditions at a modulation frequency to produce a modulation of the detected resonance, means forming a feedback control loop responsive to the modulation of the detected resonance for controlling the frequency of the resonance exciting R.F. field to maintain the center frequency of such field at the resonant frequency of the atomic resonators, the improvement comprising, means forming two series connected stages of phase sensitive detection in said feedback loop, a first stage of said phase sensitive detection detecting the second harmonic of the modulation frequency, and a second stage of said phase sensitive detection operable upon the fundamental modulation component of the output of said first stage of phase sensitive detection to produce a D.C. signal for controlling the frequency of the applied R.F. resonance exciting field to cause the center frequency of such applied R.F. field to be maintained at the resonant frequency of the atomic resonators.

2. The apparatus of claim 1 including means forming a low pass resistance-capacitance filter connected to the output of said first stage of phase sensitive detection for separating a D.C. signal corresponding to the amplitude of the second harmonic of the resonance modulation in the detected atomic resonance.

3. The apparatus of claim 1 including means forming a resistance-capacitance high pass filter connected in the output of said first stage of phase sensitive detection for separating the fundamental component of the resonance modulation in the detected atomic resonance and passing the fundamental component to said second stage of phase sensitive detection.

4. The apparatus of claim 1 wherein said first stage of phase sensitive detection includes a synchronous switching detector.

5. The apparatus of claim 1 wherein said second stage of phase sensitive detection includes a synchronous switching detector.

6. The apparatus of claim 1 including means for generating a reference second harmonic of the modulation frequency for use as a reference in said first stage of phase sensitive detection, said generator including an oscillator providing an output at a frequency four times the modulation frequency, and a divider means operable upon the output of said oscillator for dividing the output by a factor of two and producing a symmetric square wave output with a frequency at the second harmonic of the modulation frequency, whereby such square wave second harmonic is free of a fundamental modulation component.

7. The apparatus of claim 6 including means for generating a reference fundamental modulation frequency for use as a reference in said second stage of phase sensitive detection, said fundamental reference generator including a second divider means operable upon the reference second harmonic output for dividing the second harmonic output by a factor of two and producing a symmetric square wave fundamental output with a frequency at the modulation frequency, whereby such square wave fundamental output is free of second harmonic modulation component.

8. The apparatus of claim 7 including means for supplying a signal derived from said square wave fundamental output to said resonance modulating means for modulating the resonance conditions with a signal free of second harmonic content.

9. The apparatus of claim 7 including means forming a phase shifter for shifting the phase of the fundamental square wave output, said phase shifter means including a second square wave generator producing a square wave at the fundamental frequency, means forming a trigger circuit operable upon the second harmonic output to produce a sawtooth signal, means feeding the sawtooth signal to said second square wave generator, means for applying an adjustable D.C. bias voltage to said second square wave generator which D.C. bias is superimposed upon the applied sawtooth signal to trigger said square wave generator when their combined amplitude exceed a predetermined threshold level, whereby the trigger time and, thus, the phase of the fundamental square wave is varied by varying the D.C. bias level.

No references cited.

JOHN KOMINSKI, *Primary Examiner.*